United States Patent
Cho

(10) Patent No.: US 7,925,819 B2
(45) Date of Patent: Apr. 12, 2011

(54) NON-VOLATILE MEMORY STORAGE SYSTEM AND METHOD FOR READING AN EXPANSION READ ONLY MEMORY IMAGE THEREOF

(75) Inventor: Yung-Hsiang Cho, Taipei (TW)

(73) Assignee: Phison Electronics Corp., Miaoli (TW)

( * ) Notice: Subject to any disclaimer, the term of this patent is extended or adjusted under 35 U.S.C. 154(b) by 462 days.

(21) Appl. No.: 12/054,897

(22) Filed: Mar. 25, 2008

(65) Prior Publication Data

US 2009/0187699 A1    Jul. 23, 2009

(30) Foreign Application Priority Data

Jan. 23, 2008   (TW) .............................. 97102481 A

(51) Int. Cl.
*G06F 12/02* (2006.01)

(52) U.S. Cl. ......... 711/102; 711/103; 711/154; 711/202

(58) Field of Classification Search .................. 711/102, 711/103, 154, 165, 202; 710/52
See application file for complete search history.

(56) References Cited

U.S. PATENT DOCUMENTS

| | | | | |
|---|---|---|---|---|
| 6,910,113 B2 * | 6/2005 | Natu | .............................. | 711/165 |
| 2007/0250693 A1 | 10/2007 | Lin et al. | ........................... | 713/1 |

FOREIGN PATENT DOCUMENTS

CN    1484129    3/2004

OTHER PUBLICATIONS

Chinese First Examination Report of China Patent Application No. 200810083180.9, dated Apr. 21, 2010.

* cited by examiner

*Primary Examiner* — Jasmine Song
(74) *Attorney, Agent, or Firm* — J.C. Patents

(57) ABSTRACT

A non-volatile memory storage system including a connecting interface, a non-volatile memory, a buffer memory, a microcontroller, and a virtual host module is provided. The connecting interface is used for connecting to a host. The non-volatile memory is used for storing user data, wherein the non-volatile memory further stores an expansion read only memory (ROM) image to be read by the host. The buffer memory is used for temporarily storing the expansion ROM image. The microcontroller controls the operation between the connecting interface, the buffer memory, and the non-volatile memory. The virtual host module provides an activation code in the expansion ROM image to the host through the microcontroller. Thereby, both the size and the fabrication cost of the non-volatile memory storage system can be effectively reduced.

17 Claims, 2 Drawing Sheets

NON-VOLATILE MEMORY STORAGE SYSTEM AND METHOD FOR READING AN EXPANSION READ ONLY MEMORY IMAGE THEREOF

CROSS-REFERENCE TO RELATED APPLICATION

This application claims the priority benefit of Taiwan application serial no. 97102481, filed on Jan. 23, 2008. The entirety the above-mentioned patent application is hereby incorporated by reference herein and made a part of specification.

BACKGROUND

1. Technology Field

The present invention generally relates to a storage system, in particular, to a non-volatile memory storage system and a method for reading an expansion read only memory (ROM) image thereof.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Thereby, flash memory storage device has become one of the most focused electronic products in recent years. How to produce smaller and lighter flash memory storage devices has become one of the major subjects in the industry along with the trend of minimizing digital products.

A flash memory storage device is usually connected to a host through a connecting interface, such as a universal serial bus (USB) or a PCI bus. It should be mentioned here that the basic input/output system (BIOS) in the host cannot turn on a device which does not support any plug and play bus (for example, a PCI bus) when the host is booted up. Thus, if the bus in the flash memory storage device does not support the plug and play function, the flash memory storage device has to be additionally disposed with an expansion read only memory (ROM) which stores an activation code for turning on the flash memory storage device. The BIOS of the host detects the expansion ROM during the execution thereof and copies the activation code in the expansion ROM to a random access memory (RAM) of the host to be executed and to turn on the flash memory storage device. After that, the operating system executes the corresponding driving program to drive the flash memory storage device. However, the ROM takes up space in the flash memory storage device and accordingly the flash memory storage device cannot be effectively reduced.

SUMMARY

Accordingly, the present invention is directed to a non-volatile memory storage system which provides the expansion read only memory (ROM) function without an expansion ROM such that both the size and the fabrication cost of the non-volatile memory storage system can be effectively reduced.

The present invention is directed to a method for reading an expansion ROM image, wherein the expansion ROM function is provided without using any additional storage unit for storing an expansion ROM such that both the size and the fabrication cost of a non-volatile memory storage system can be effectively reduced.

The present invention provides a non-volatile memory storage system including a connecting interface, a non-volatile memory and a controller coupled the connecting interface and the non-volatile memory. The connecting interface is used for connecting to a host. The non-volatile memory is used for storing user data, wherein the non-volatile memory further stores an expansion ROM image to be read by the host. The buffer memory is used for temporarily storing the expansion ROM image. The controller comprises a microcontroller, a buffer memory and a virtual host module. The buffer memory is coupled the microcontroller for temporarily storing the expansion ROM image. The virtual host module, coupled the microcontroller for providing an activation code in the expansion ROM image to the host through the microcontroller.

According to an embodiment of the present invention, the virtual host module includes an address register and an expansion ROM accessor. The address register is used for mapping the address of the activation code in the expansion ROM image to be read by the host and the address of the activation code in the expansion ROM image stored in the non-volatile memory. The expansion ROM accessor notifies the host that the non-volatile memory storage system has the expansion ROM image. The expansion ROM accessor receives a read command for reading the activation code in the expansion ROM image from the host, provides the address mapped by the address register to the microcontroller according to the read command, reads the activation code in the expansion ROM image from the buffer memory in unit of bytes, and transmits the activation code to the host, wherein the microcontroller reads the activation code in the expansion ROM image stored in the non-volatile memory according to the mapped address and temporarily stores the activation code into the buffer memory.

According to an embodiment of the present invention, the microcontroller reads in advance the activation code in the expansion ROM image in unit of sectors and temporarily stores the activation code into the buffer memory.

According to an embodiment of the present invention, the expansion ROM accessor reads the activation code temporarily stored in the buffer memory by referring to a buffer index register.

According to an embodiment of the present invention, the non-volatile memory is a flash memory.

According to an embodiment of the present invention, the connecting interface is a PCI express connecting interface.

According to an embodiment of the present invention, a transmitter and a receiver of the PCI express connecting interface on the physical layer include one or multiple lanes for data transmission.

The present invention provides a method for reading an expansion ROM image, wherein the expansion ROM image is stored in a non-volatile memory for storing user data in a non-volatile memory storage system. The method includes following steps. First, a read command used for reading an activation code in the expansion ROM image is received from a host connected to the non-volatile memory storage system. Next, the corresponding address of the activation code stored in the non-volatile memory is determined according to the address of the activation code in the expansion ROM image in the read command, and the read command and the address are transmitted to a microcontroller of the non-volatile memory storage system. After that, the activation code in the expansion ROM image is read and stored into a buffer memory of the non-volatile memory storage system. Finally, the activation code in the expansion ROM image is transmitted from the buffer memory to the host, wherein the activation code in the expansion ROM image is read from the non-volatile memory in unit of sectors, and the activation code in the expansion ROM image is transmitted from the buffer memory to the host in unit of bytes.

According to an embodiment of the present invention, the method for reading an expansion ROM image further includes reading in advance the activation code in the expansion ROM image in unit of sectors and temporarily storing the activation code into the buffer memory.

The present invention provides a controller, suitable for a non-volatile memory storage apparatus having at least one non-volatile memory, the controller comprising a microcontroller, a buffer memory and a virtual host module. The buffer memory is coupled to the microcontroller for temporarily storing a expansion read only memory (ROM) image read from the non-volatile memory. The virtual host module, coupled to the microcontroller for providing an activation code in the expansion ROM image to a host through a connecting interface.

According to an embodiment of the present invention, the virtual host module comprises an address register and an expansion ROM accessor. The address register is used for mapping an address of the activation code in the expansion ROM image to be read by the host and an address of the activation code in the expansion ROM image stored in the non-volatile memory. The expansion ROM accessor is used for notifying the host that the non-volatile memory storage system has the expansion ROM image. The expansion ROM accessor receives a read command for reading the activation code in the expansion ROM image from the host, provides the address mapped by the address register to the microcontroller according to the read command, reads the activation code in the expansion ROM image from the buffer memory in unit of bytes, and transmits the activation code to the host, wherein the microcontroller reads the activation code in the expansion ROM image stored in the non-volatile memory according to the mapped address and temporarily stores the activation code into the buffer memory.

According to an embodiment of the present invention, the microcontroller reads in advance the activation code in the expansion ROM image in unit of sectors and temporarily stores the activation code into the buffer memory.

According to an embodiment of the present invention, the expansion ROM accessor reads the activation code temporarily stored in the buffer memory by referring to a buffer index register.

According to an embodiment of the present invention, the non-volatile memory is a flash memory.

According to an embodiment of the present invention, the connecting interface is a PCI express connecting interface.

According to an embodiment of the present invention, a transmitter and a receiver of the PCI express connecting interface on a physical layer include one or multiple lanes for data transmission.

According to an embodiment of the present invention, the storage apparatus is a flash disk, a flash memory card, or a solid state drive (SSD).

According to the present invention, a non-volatile memory for storing user data in a non-volatile memory storage system is used for storing an expansion ROM image so that no additional storage medium is required for storing the expansion ROM image. Accordingly, both the size and the fabrication cost of the non-volatile memory storage system can be effectively reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
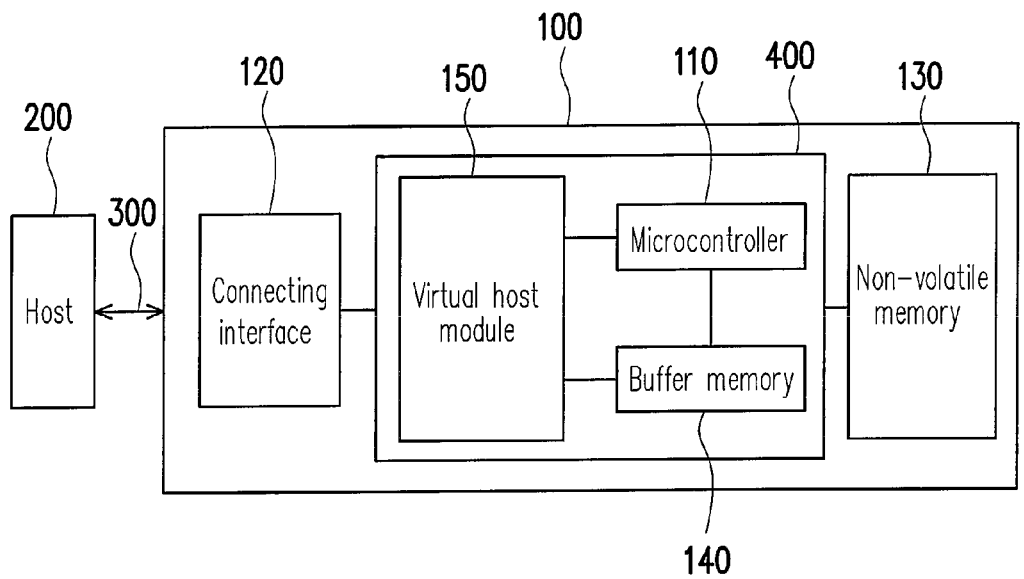
FIG. 1 is a block diagram of a non-volatile memory storage system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, an expansion read only memory (ROM) image is stored in a non-volatile memory of a non-volatile memory storage device for replacing the conventional expansion ROM so that the size and fabrication cost of the non-volatile memory storage device can be both reduced. In particular, the basic input/output system (BIOS) in a host reads the expansion ROM (for example, in unit of bytes) differently as a microcontroller in the non-volatile memory storage device reads the non-volatile memory (for example, in unit of sectors). Thus, in the present invention, a virtual host module is embodied as a communication bridge between the host and the microcontroller for transmitting an activation code in the expansion ROM image to the host. Moreover, since the non-volatile memory storage device in the present invention does not have an expansion ROM, the virtual host module is also used for notifying the host that the non-volatile memory storage device has an expansion ROM image.

Below, embodiments of the present invention will be described in detail with reference to accompanying drawings.

FIG. 1 is a block diagram of a non-volatile memory storage system according to an embodiment of the present invention.

Referring to FIG. 1, the non-volatile memory storage system 100 includes a connecting interface 120, a non-volatile memory 130 and a controller 400 electrically connected the connecting interface 120 and the non-volatile memory 130.

The connecting interface 120 is connected to a host 200 through a bus 300. In the present embodiment, the connecting interface 120 is a PCI express interface therefore can be referred as a PCI express connecting interface 120. However, the present invention is not limited thereto, and the connecting interface 120 may also be other suitable data transmission interfaces, especially data transmission interfaces which are not supported by the BIOS or an extensible firmware interface (EFI) of the host 200.

Additionally, in the present embodiment, a transmitter Tx and a receiver Rx of the PCI express connecting interface 120 on the physical layer are constituted by a lane for data transmission. However, it should be understood that multiple lanes may also be used for data transmission in the present invention.

The non-volatile memory 130 is an element used for storing user data in the non-volatile memory storage system 100. It should be mentioned that in the present embodiment, the non-volatile memory 130 has a reserved area used for storing the expansion ROM image to be read by the host 200, wherein the expansion ROM image contains an activation code used for turning on the non-volatile memory storage system 100.

To be specific, since the BIOS of the host 200 cannot identify an apparatus with a PCI express interface, when the non-volatile memory storage system 100 having the PCI express connecting interface 120 is electrically connected to the host 200, the activation code is provided to the BIOS of the host 200 to enable the non-volatile memory storage system 100 and the non-volatile memory storage system 100 is then driven by a driving program in the operating system. Here, the expansion ROM image which provides the activation code for turning on the apparatus having a PCI express interface may also be referred as a PCI express expansion ROM image. In the present embodiment, the non-volatile memory 130 is a flash memory. However, the present invention may also be applied to other non-volatile memories.

The controller 400 controls the connecting interface 120 and the non-volatile memory 130 to perform the operations of writing, reading and erasing data. The controller 400 includes a microcontroller 110, a buffer memory 140, and a virtual host module 150.

The microcontroller 110 is used for controlling operations of all components in the non-volatile memory storage system 100.

The buffer memory 140 is used for temporarily storing user data transmitted between the host 200 and the non-volatile memory or is used for temporarily storing system data (for example, a firmware) in order to accelerate the execution of the microcontroller 110. In particular, in the present embodiment, the buffer memory 140 is used for temporarily storing the activation code in the PCI express expansion ROM image to be transmitted to the host 200. In the present embodiment, the buffer memory 110d is a static random access memory (SRAM). However, the present invention is not limited thereto, and a dynamic random access memory (DRAM), a magnetoresistive random access memory (MRAM), a phase change random access memory (PRAM), or other suitable memories may also be applied in the present invention.

The virtual host module 150 is embodied with a firmware and is used for notifying the host 200 that the non-volatile memory storage system 100 has the expansion ROM image, and the virtual host module 150 provides the activation code in the expansion ROM image. To be specific, in the present embodiment, since the non-volatile memory storage system 100 is a PCI express interface, the virtual host module 150 is a device used for notifying the host 200 that the non-volatile memory storage system 100 is a PCI express interface having a PCI express expansion ROM image, and the virtual host module 150 transmits the activation code in the PCI express expansion ROM image to the host 200. In the present embodiment, the virtual host module 150 may also be referred as a virtual PCI express host module 150.

Figure 2:
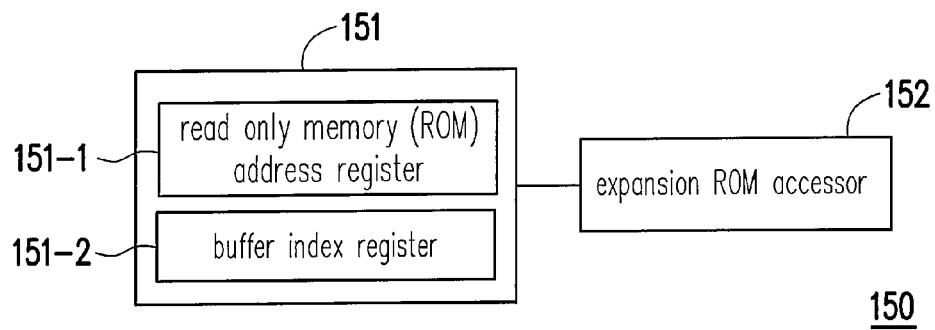
FIG. 2 is a block diagram of a virtual host module in FIG. 1.

It should be mentioned that a specific register is defined in the specification of PCI express interface for storing the address of the expansion ROM in a physical memory so that the BIOS of the host can read the activation code for turning on the non-volatile memory storage system 100. However, as described above, the BIOS of the host 200 reads the expansion ROM in unit of bytes, while the microcontroller 110 in the non-volatile memory storage system 100 reads the non-volatile memory in unit of sectors (512 bytes). Thus, according to the present embodiment, the virtual host module 150 provides an address mapping function such that the expansion ROM image can be read smoothly. The virtual PCI express host module 150 may include an address register 151 and an expansion ROM accessor 152 (as shown in FIG. 2).

The address register 151 is used for mapping the address of the PCI express expansion ROM image to be read by the host 200 and the address of the PCI express expansion ROM image stored in the non-volatile memory 130. In other words, when the host 200 is about to read the activation code in the PCI express expansion ROM image, the address register 151 maps the address of the activation code to be read by the host 200 to a corresponding address in the non-volatile memory 130.

The expansion ROM accessor 152 is used for notifying the host 200 that the non-volatile memory storage system 100 has a PCI express expansion ROM image.

Besides, the expansion ROM accessor 152 receives a read command for reading the activation code in the PCI express expansion ROM image from the host 200 and provides the read command to the microcontroller 110.

Thereafter, the microcontroller 110 receives the read command from the expansion ROM accessor 152 and obtains the mapped address to be read by the BIOS of the host 200 from a ROM address register 151-1 in the address register 151. Accordingly, the microcontroller 110 reads the activation code in the PCI express expansion ROM image stored in the non-volatile memory 130 according to the mapped address in unit of sectors and temporarily stores the activation code into the buffer memory 140. In other words, after obtaining the address range to be read by the BIOS of the host 200 from the ROM address register 151-1 of the address register 151, the microcontroller 110 reads the corresponding activation code from the non-volatile memory 130.

Next, the expansion ROM accessor 152 reads the activation code in the PCI express expansion ROM image from the buffer memory 140 in unit of bytes and transmits the activation code to the host 200.

In the operation of the BIOS of the host 200 for reading the activation code in the PCI express expansion ROM image, the BIOS of the host 200 first reads the header (usually 3 bytes) of the activation code to determine the length of the activation code and then reads the entire activation code (usually 8 K bytes) continuously. Thus, in another embodiment of the present invention, when the BIOS of the host 200 is still reading the header of the activation code or the activation code required to be read, the microcontroller 110 continuously reads in advance the unread activation code in the PCI express expansion ROM image in unit of sectors and stores the activation code into the buffer memory 140. Accordingly, the speed for the BIOS of the host 200 to read the activation code is increased since the microcontroller 110 has stored the entire activation code in the PCI express expansion ROM image into the buffer memory 140 in advance.

It should be mentioned that after storing the activation code in the PCI express expansion ROM image into the buffer memory 140, the microcontroller 110 reads the activation code temporarily stored in the buffer memory 140 through a buffer index register 151-2 of the address register 151.

Figure 3:
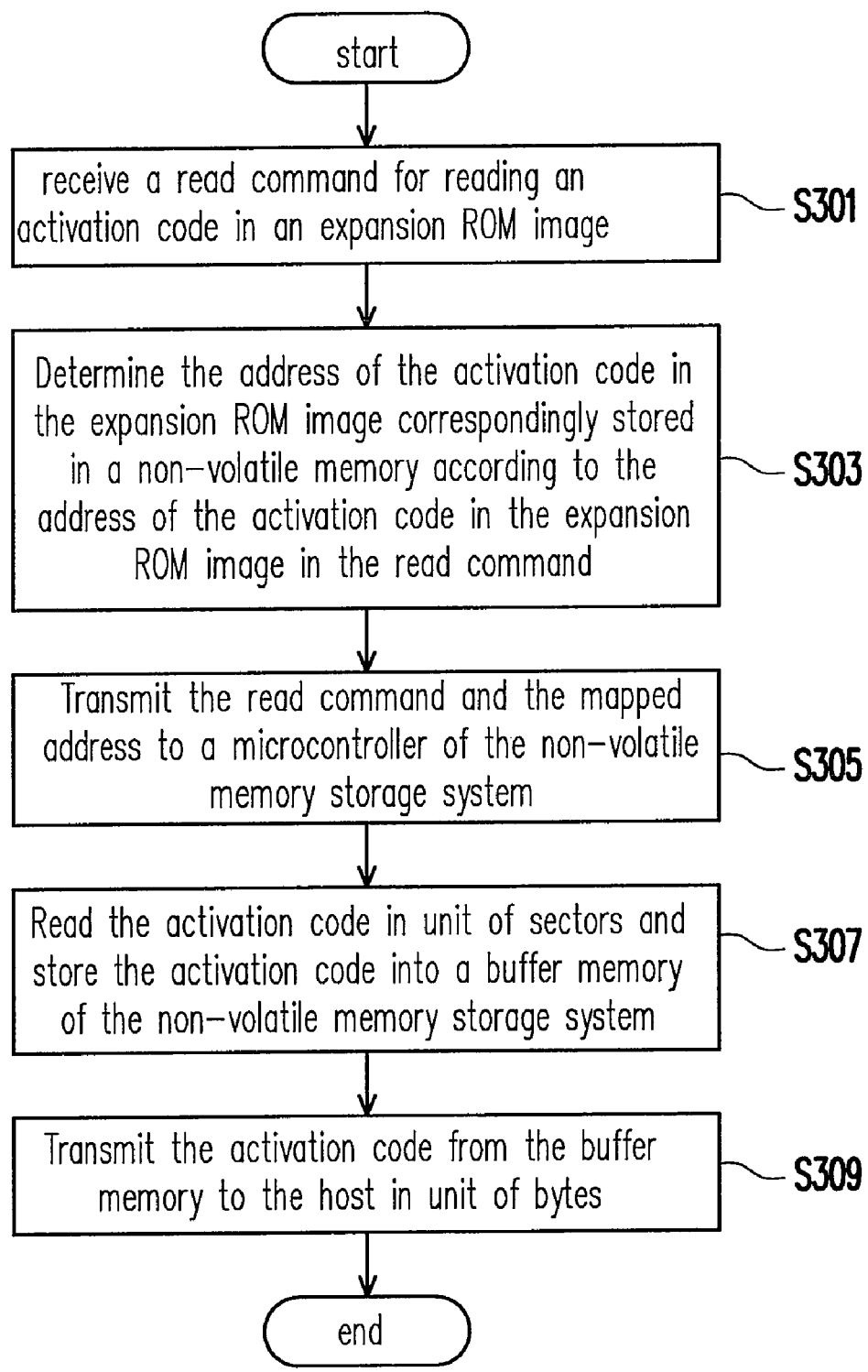
FIG. 3 is a flowchart illustrating a method for reading an expansion read only memory (ROM) image according to an embodiment of the present invention.

FIG. 3 is a flowchart illustrating a method for reading an expansion read only memory (ROM) image according to an embodiment of the present invention.

Referring to FIG. 3, when the BIOS of the host 200 identifies through the expansion ROM accessor 152 that the non-volatile memory storage system 100 is a device with a PCI express expansion ROM image, in step S301, the BIOS of the host 200 receives a read command for reading the activation code in the expansion ROM image from the host 200.

Next, in step S303, the corresponding address of the activation code stored in the non-volatile memory 140 is determined according to the address of the activation code in the PCI express expansion ROM image in the read command. After that, the read command and the corresponding address are transmitted to the microcontroller 110 of the non-volatile memory storage system 100 (step S305), and the activation code is read in unit of sectors and stored into the buffer memory 140 of the non-volatile memory storage system 100 (step S307). Finally, the activation code is read from the buffer memory 140 in unit of bytes and transmitted to the host 200 (step S309).

In another embodiment of the present invention, the method for reading the expansion ROM image further includes reading in advance the other activation code in the PCI express expansion ROM image in unit of sectors and temporarily storing the activation code into the buffer memory 140 so as to increase the speed of the BIOS of the host 200 for reading the activation code.

In overview, according to the present invention, an existing non-volatile memory in a non-volatile memory storage system is used for storing an expansion ROM image so that no additional storage medium is required for storing an activation code even if the non-volatile memory is disposed with a connecting interface which is not supported by the BIOS of a host. Thereby, both the size and the fabrication cost of the non-volatile memory storage system can be effectively reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-volatile memory storage system, comprising:
a connecting interface, for connecting to a host;
a non-volatile memory, for storing user data, wherein the non-volatile memory further stores an expansion read only memory (ROM) image to be read by the host;
a controller, coupled the connecting interface and the non-volatile memory, comprising:
a microcontroller;
a buffer memory, coupled the microcontroller for temporarily storing the expansion ROM image; and
a virtual host module, coupled the microcontroller for providing an activation code in the expansion ROM image to the host through the microcontroller and mapping an address of the activation code in the expansion ROM image to be read by the host and an address of the activation code in the expansion ROM image stored in the non-volatile memory.

2. The non-volatile memory storage system according to claim 1, wherein the virtual host module comprises:
an address register, for mapping the address of the activation code in the expansion ROM image to be read by the host and the address of the activation code in the expansion ROM image stored in the non-volatile memory;
an expansion ROM accessor, for notifying the host that the non-volatile memory storage system has the expansion ROM image;
wherein the expansion ROM accessor receives a read command for reading the activation code in the expansion ROM image from the host, provides the address mapped by the address register to the microcontroller according to the read command, reads the activation code in the expansion ROM image from the buffer memory in unit of bytes, and transmits the activation code to the host; and
wherein the microcontroller reads the activation code in the expansion ROM image stored in the non-volatile memory according to the mapped address and temporarily stores the activation code into the buffer memory.

3. The non-volatile memory storage system according to claim 2, wherein the microcontroller reads in advance the activation code in the expansion ROM image in unit of sectors and temporarily stores the activation code into the buffer memory.

4. The non-volatile memory storage system according to claim 3, wherein the expansion ROM accessor reads the activation code temporarily stored in the buffer memory by referring to a buffer index register.

5. The non-volatile memory storage system according to claim 1, wherein the non-volatile memory is a flash memory.

6. The non-volatile memory storage system according to claim 1, wherein the connecting interface is a PCI express connecting interface.

7. The non-volatile memory storage system according to claim 6, wherein a transmitter and a receiver of the PCI express connecting interface on a physical layer include one or multiple lanes for data transmission.

8. A method for reading an expansion ROM image, wherein the expansion ROM image is stored in a non-volatile memory for storing user data in the non-volatile memory storage system, the method for reading the expansion ROM image comprising:
receiving a read command for reading an activation code in the expansion ROM image from a host connected to the non-volatile memory storage system;
determining a corresponding address of the activation code in the expansion ROM image stored in the non-volatile memory according to an address of the activation code in the expansion ROM image in the read command;
transmitting the read command and the corresponding address to a microcontroller of the non-volatile memory storage system;
reading the activation code in the expansion ROM image and storing the activation code to a buffer memory of the non-volatile memory storage system;
transmitting the activation code in the expansion ROM image from the buffer memory to the host; and
wherein the activation code in the expansion ROM image is read from the non-volatile memory in unit of sectors, and the activation code in the expansion ROM image is transmitted from the buffer memory to the host in unit of bytes.

9. The method according to claim 8 further comprising reading in advance the activation code in the expansion ROM image in unit of sectors and temporarily storing the activation code into the buffer memory.

10. A controller, suitable for a non-volatile memory storage apparatus having at least one non-volatile memory, the controller comprising:
a microcontroller;
a buffer memory, coupled to the microcontroller for temporarily storing a expansion read only memory (ROM) image read from the non-volatile memory; and
a virtual host module, coupled to the microcontroller for providing an activation code in the expansion ROM image to a host through a connecting interface and mapping an address of the activation code in the expansion ROM image to be read by the host and an address of the activation code in the expansion ROM image stored in the non-volatile memory.

11. The controller according to claim 10, wherein the virtual host module comprises:
an address register, for mapping the address of the activation code in the expansion ROM image to be read by the host and the address of the activation code in the expansion ROM image stored in the non-volatile memory;

an expansion ROM accessor, for notifying the host that the non-volatile memory storage system has the expansion ROM image;

wherein the expansion ROM accessor receives a read command for reading the activation code in the expansion ROM image from the host, provides the address mapped by the address register to the microcontroller according to the read command, reads the activation code in the expansion ROM image from the buffer memory in unit of bytes, and transmits the activation code to the host; and wherein the microcontroller reads the activation code in the expansion ROM image stored in the non-volatile memory according to the mapped address and temporarily stores the activation code into the buffer memory.

12. The controller according to claim 11, wherein the microcontroller reads in advance the activation code in the expansion ROM image in unit of sectors and temporarily stores the activation code into the buffer memory.

13. The controller according to claim 12, wherein the expansion ROM accessor reads the activation code temporarily stored in the buffer memory by referring to a buffer index register.

14. The controller according to claim 10, wherein the non-volatile memory is a flash memory.

15. The controller according to claim 10, wherein the connecting interface is a PCI express connecting interface.

16. The controller according to claim 15, wherein a transmitter and a receiver of the PCI express connecting interface on a physical layer include one or multiple lanes for data transmission.

17. The controller according to claim 10, wherein the storage apparatus is a flash disk, a flash memory card, or a solid state drive (SSD).

* * * * *